United States Patent [19]
Yanagihara et al.

[11] Patent Number: 6,006,720
[45] Date of Patent: Dec. 28, 1999

[54] INTERNAL COMBUSTION ENGINE

[75] Inventors: Hiromichi Yanagihara, Gotemba; Yasuo Sato, Susono, both of Japan

[73] Assignee: Toyota Jidosha Kabushiki Kaisha, Aichi, Japan

[21] Appl. No.: 09/005,883

[22] Filed: Jan. 12, 1998

[30] Foreign Application Priority Data

| Jan. 13, 1997 | [JP] | Japan | 9-003976 |
| Mar. 5, 1997 | [JP] | Japan | 9-050304 |

[51] Int. Cl.⁶ ........................................ F02B 3/08
[52] U.S. Cl. ............................. 123/305; 123/435
[58] Field of Search ........................... 123/305, 435

[56] References Cited

U.S. PATENT DOCUMENTS

| 4,002,151 | 1/1977 | Toyoda et al. . | |
| 4,455,987 | 6/1984 | Südbeck et al. | 123/569 |
| 4,479,473 | 10/1984 | Wade | 123/341 |
| 4,509,492 | 4/1985 | Ochiai et al. | 123/569 |
| 5,115,789 | 5/1992 | Aoyama | 123/569 |
| 5,341,783 | 8/1994 | Beck et al. | 123/446 |
| 5,467,757 | 11/1995 | Yanagihara et al. | 123/305 |
| 5,520,161 | 5/1996 | Klopp | 123/676 |
| 5,626,115 | 5/1997 | Kawaguchi | 123/305 |
| 5,671,600 | 9/1997 | Pischinger et al. | 60/605.2 |
| 5,682,864 | 11/1997 | Shirakawa | 123/569 |
| 5,743,243 | 4/1998 | Yanagahira | 123/305 |
| 5,797,367 | 8/1998 | Iida et al. | 123/305 |

FOREIGN PATENT DOCUMENTS

| 0639710 | 2/1995 | European Pat. Off. . |
| 0731262 | 9/1996 | European Pat. Off. . |
| 7317588A | 12/1995 | Japan . |

OTHER PUBLICATIONS

Prof. Ir. J.J. Broeze: "Combustion in Piston Engines", DE Technische Uitgeverij H. Stam N.V., Haarlem XP002061192, pp. 127–133.

Patent Abstracts of Japan, vol. 010, No. 130 (M–478), May 14, 1986 & JP 60 25653 A (Nihon Kurinenjin Kenkysuho:KK), Dec. 18, 1985.

*Primary Examiner*—Erick R. Solis
*Attorney, Agent, or Firm*—Kenyon & Kenyon

[57] ABSTRACT

An internal combustion engine comprising a fuel injector arranged in a combustion chamber. A fuel is injected at a timing when the temperature T of the fuel particles fed into the combustion chamber rises past the vicinity of a minimum temperature of a cool flame region during a compression stroke and reaches a reaction stagnation region near the top dead center of the compression stroke and the fuel particles are dispersed throughout the combustion chamber as a whole near the top dead center of the compression stroke.

11 Claims, 11 Drawing Sheets

6,006,720

INTERNAL COMBUSTION ENGINE

BACKGROUND OF THE INVENTION

1. Field of the Invention

The present invention relates to an internal combustion engine.

2. Description of the Related Art

Known in the art is a compression-ignition type engine wherein fuel is injected into the combustion chamber in a compression stroke slightly before 60 degrees before top dead center in the compression stroke, the mean particle size of the fuel injected at that time is made at least a particle size where the temperature of the fuel particles reaches a boiling point of the main fuel ingredient, determined by the pressure at that time, at about top dead center in the compression stroke or after top dead center in the compression stroke so as to prevent evaporation of the fuel due to boiling of the main fuel ingredient from the fuel particles after injection up until the top dead center of the compression stroke is reached and so as to make the main fuel ingredient in the fuel particles boil and evaporate to cause ignition and combustion of the fuel after substantially the top dead center in the compression stroke (Japanese Unexamined Patent Publication (Kokai) No. 7-317588).

In this compression-ignition type engine, the intention is to make the particles of the injected fuel disperse uniformly in the combustion chamber and thereby to make the generation of soot and $NO_x$ substantially zero. That is, if the pressure in the combustion chamber becomes high, the air resistance becomes larger, so it is not possible to make the particles of the injected fuel disperse throughout a broad range. Therefore, to enable the particles of the injected fuel to be dispersed throughout a broad range, the fuel is made to be injected slightly before 60 degrees before top dead center of the compression stroke, where the pressure in the combustion chamber is low.

Even if the particles of the injected fuel are dispersed over a broad range, however, if a portion of heavy density of the evaporated fuel is formed from the fuel particles, $NO_x$ and soot will be generated. The reasons for this will be explained in detail later, but roughly speaking are as follows:

That is, if the fuel is injected slightly before 60 degrees before top dead center of the compression stroke in the above way and the fuel particles are large in size, the evaporation of fuel due to boiling of the main fuel ingredient of the fuel particles will be prevented until the substantially top dead center of the compression stroke is reached. The injected fuel, however, includes low boiling point ingredients. The boiling temperature of the low boiling point ingredients, that is, the initial boiling point, is a temperature considerably lower than the boiling temperature of the main fuel ingredient. Therefore, if the temperature in the combustion chamber at the time of fuel injection is higher than the initial boiling point, the low boiling point ingredients in the injected fuel will immediately evaporate. As opposed to this, if the temperature in the combustion chamber at the time of fuel injection is lower than the initial boiling point, the low boiling point ingredients in the injected fuel will evaporate when the temperature in the combustion chamber exceeds the initial boiling point. If the low boiling point ingredients in the injected fuel are evaporated, a layer of evaporated fuel comprised of the low boiling point ingredients will be formed around the fuel particles.

On the other hand, when the compression stroke proceeds, the temperature in the combustion chamber rises. When the temperature in the combustion chamber reaches a certain temperature or more, the evaporated fuel around the fuel particles will bond with oxygen and be burned. If the density of the fuel particles at this time is high, the fuel particles will receive the heat of combustion of the evaporated fuel from the surrounding fuel particles and become high in temperature. As a result, the hydrocarbons in the fuel particles will be decomposed by the heat into hydrogen atoms $H_2$ and carbon C. The hydrogen atoms $H_2$ produced by this heat decomposition will burn explosively and generate a high temperature, therefore $NO_x$ will be produced. On the other hand, if carbon C is produced due to the heat decomposition, the carbon atoms will bond with each other and will partially be exhausted as soot.

In this way, if the density of the fuel particles is high, $NO_x$ and soot will be produced due to the heat decomposition of the hydrocarbons in the fuel particles. To prevent the generation of such $NO_x$ and soot, it is sufficient to increase the interval between the fuel particles. Therefore, it is sufficient to cause the fuel particles to disperse over a wide range. Accordingly, the above in-cylinder injection type internal combustion engine is designed to inject the fuel slightly before 60 degrees before top dead center of the compression stroke so as to cause the fuel particles to disperse over a wide range.

The temperature in the combustion chamber slightly before 60 degrees before top dead center of the compression stroke, however, becomes higher than the initial boiling point of the injected fuel, so if fuel is injected, the low boiling point ingredients in the injected fuel will immediately evaporate. As a result, a region of high density evaporated fuel of the low boiling point ingredient will be locally formed around the fuel injector. If a region of high density evaporated fuel is formed in this way, even if the space between fuel particles becomes large, the fuel particles will become high in temperature due to the heat of combustion of the evaporated fuel present at a high density between the fuel particles and therefore the hydrocarbons in the fuel particles will be decomposed by the heat into hydrogen atoms $H_2$ and carbon C, so $NO_x$ and soot will be generated.

To prevent the generation of such $NO_x$ and soot, it is necessary to prevent the local formation of a region of high density evaporated fuel of the low boiling point ingredient. Toward this end, it is necessary to complete the fuel injection and complete the dispersion of the injected fuel before the temperature in the combustion chamber reaches the initial boiling temperature.

SUMMARY OF THE INVENTION

An object of the present invention is to provide an internal combustion engine capable of making the amount of production of soot and $NO_x$ substantially zero.

According to the present invention, there is provided an internal combustion engine comprising a combustion chamber; a fuel injector arranged in the combustion chamber; and injection control means for injecting fuel at a timing when a temperature of fuel particles fed into the combustion chamber rises past the vicinity of a minimum temperature of a cool flame region during a compression stroke, determined by temperature and pressure in the combustion chamber, and reaches a reaction stagnation region, determined by the temperature and pressure in the combustion chamber, near the top dead center of the compression stroke and the fuel particles are dispersed throughout the combustion chamber as a whole near the top dead center of the compression stroke, wherein the fuel particles boil and evaporate at substantially the top dead center of the compression stroke or after top dead center of the compression stroke and the fuel is ignited and burned.

The present invention may be more fully understood from the description of the preferred embodiments of the invention set forth below together with the accompanying drawings.

DESCRIPTION OF THE PREFERRED EMBODIMENTS

Figure 1:
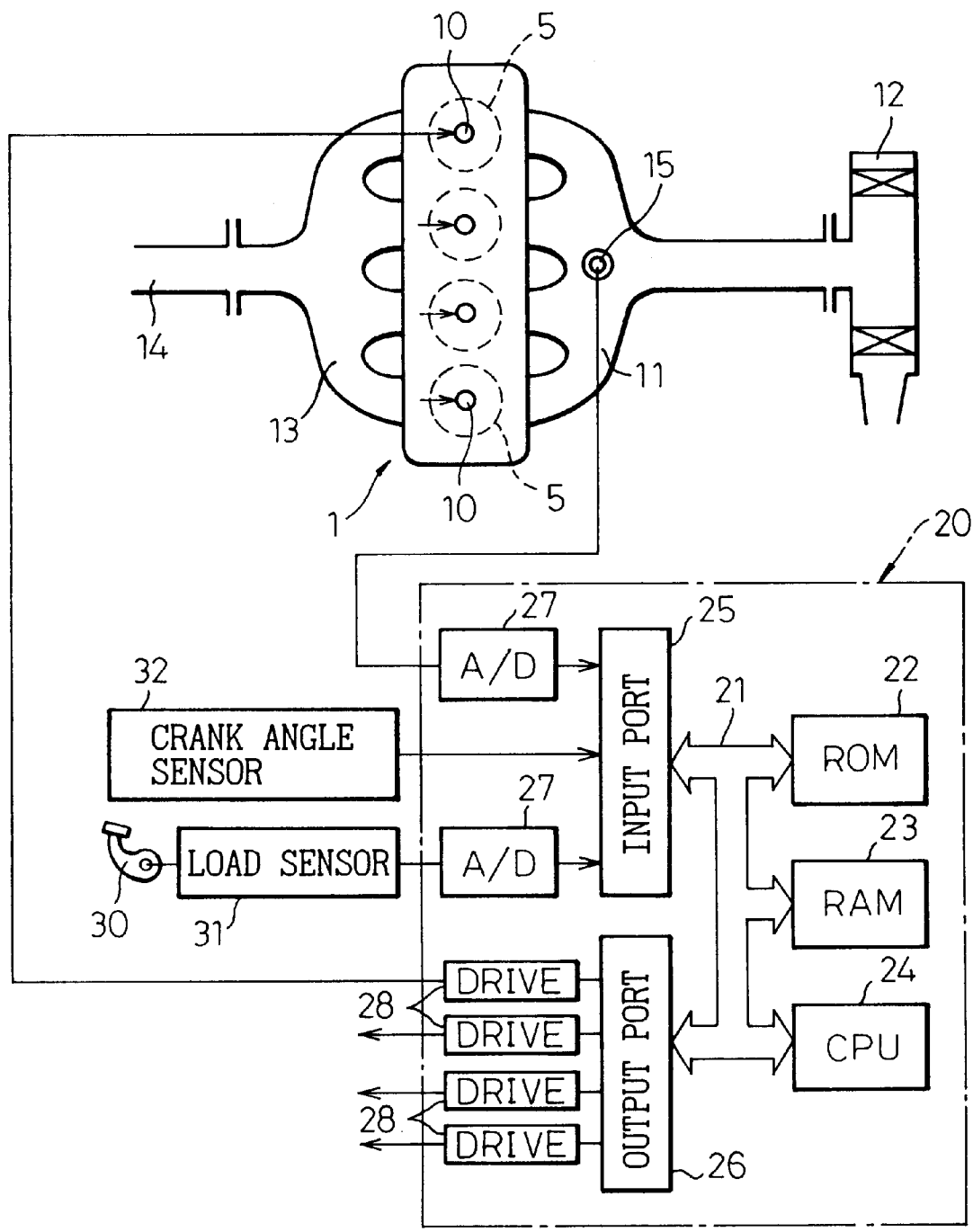
FIG. 1 is an overview of an internal combustion engine.
Figure 2:
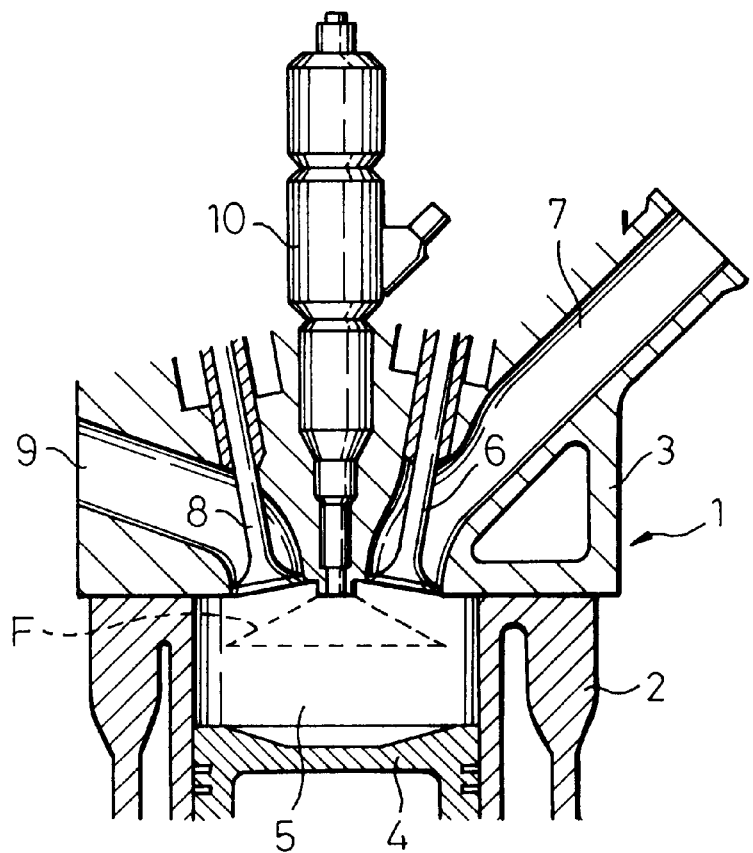
FIG. 2 is a side sectional view of the internal combustion engine.
Figure 3:
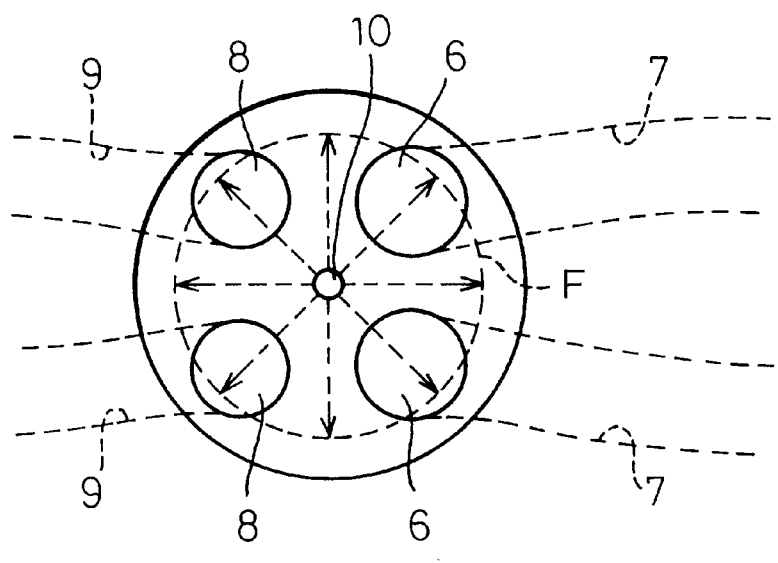
FIG. 3 is a bottom view of a cylinder head of FIG. 2.

Referring to FIG. 1 to FIG. 3, 1 designates an engine body, 2 a cylinder block, 3 a cylinder head, 4 a piston, 5 a combustion chamber, 6 a pair of intake valves, 7 a pair of intake ports, 8 a pair of exhaust valves, 9 a pair of exhaust ports, and 10 a fuel injector arranged at the top center of the combustion chamber 5. The intake ports 7 are connected to an air cleaner 12 through an intake manifold 11, while the exhaust ports 9 are connected to an exhaust pipe 14 through an exhaust manifold 13. As shown in FIG. 2 and FIG. 3, the intake ports 7 are each comprised of a straight port extending substantially straight. Therefore, in the internal combustion engine shown in FIG. 1 to FIG. 3, a swirl cannot be produced in the combustion chamber 5 by the flow of air from the intake port 7 to the combustion chamber 5.

As shown in FIG. 1, an electronic control unit 20 is comprised of a digital computer and is provided with a ROM (read only memory) 22, RAM (random access memory) 23, CPU (microprocessor) 24, input port 25, and output port 26 connected through a bidirectional bus 21. In the intake manifold 11 is mounted an intake air temperature sensor 15 for generating an output voltage proportional to the intake air temperature. The output voltage of this intake air temperature sensor 15 is input through a corresponding AD converter 27 to the input port 25. An accelerator pedal 30 has connected to it a load sensor 31 for generating an output voltage proportional to the amount of depression of the accelerator pedal 30. The output voltage of the load sensor 31 is input through a corresponding AD converter 27 to the input port 25. Further, a crank angle sensor 32 for generating an output pulse each time the engine rotates a predetermined crank angle is connected to the input port 25. The current crank angle and engine rotational speed are calculated from the output pulse of the crank angle sensor 32. On the other hand, the output port 26 is connected to the fuel injector 10 through a corresponding drive circuit 28.

Figure 4:
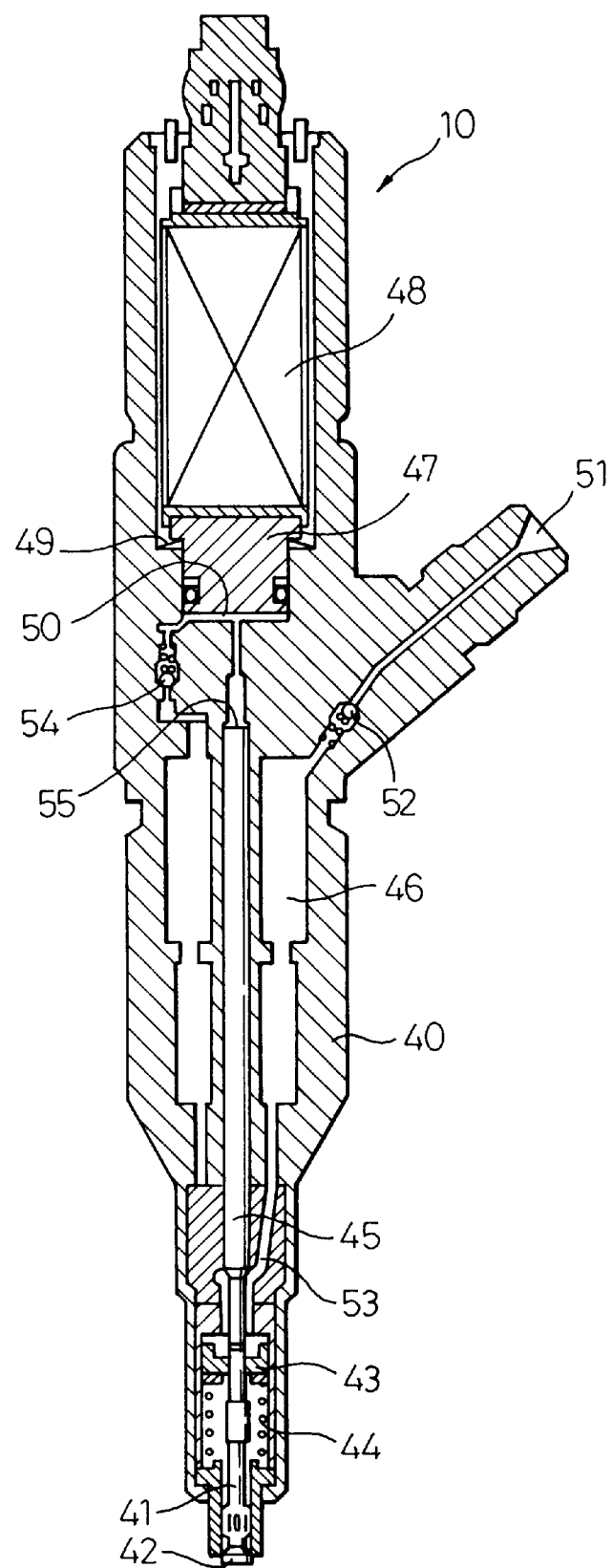
FIG. 4 is a side sectional view of a fuel injector.

FIG. 4 is a side sectional view of a fuel injector 10. Referring to FIG. 4, 41 is a needle slidable in the fuel injector body 40, 42 is a valve body formed integrally with the front end of the needle 41, 43 is a spring retainer attached to the top end of the needle 41, 44 is a compression spring biasing the spring retainer 43 in the upward direction, 45 is a rod arranged aligned with the needle 41, 46 is a fuel storage chamber having a capacity several tens of the amount of fuel injection at the time of maximum fuel injection, 47 is a piston arranged slidably in the injector body 40, 48 is a piezoelectric element for driving the piston 47, 49 is a plate spring biasing the piston 47 toward the piezoelectric element 48, 50 is a variable capacity chamber defined by the top face of the piston 47, and 51 is a fuel supply port.

The fuel supply port 51 is connected to an injection pump (not shown). The fuel discharged from the injection pump is supplied to the fuel supply port 51. The fuel supplied to the fuel supply port 51 is supplied to the fuel storage chamber 46 through the check valve 52, which allows passage only from the fuel support port 51 to the fuel storage chamber 46. The fuel supplied in the fuel storage chamber 46 is led to around the front end of the needle 41 through the fuel passage 53 on one hand and is supplied to the variable capacity chamber 50 through the check valve 54, which allows passage only from the fuel storage chamber 46 to the variable capacity chamber 50, on the other hand. The fuel supplied to the inside of the variable capacity chamber 50 is led to the top face 55 of the rod 45 and therefore the fuel pressure in the variable capacity chamber 50 acts on the top face 55 of the rod 45.

Figure 5:
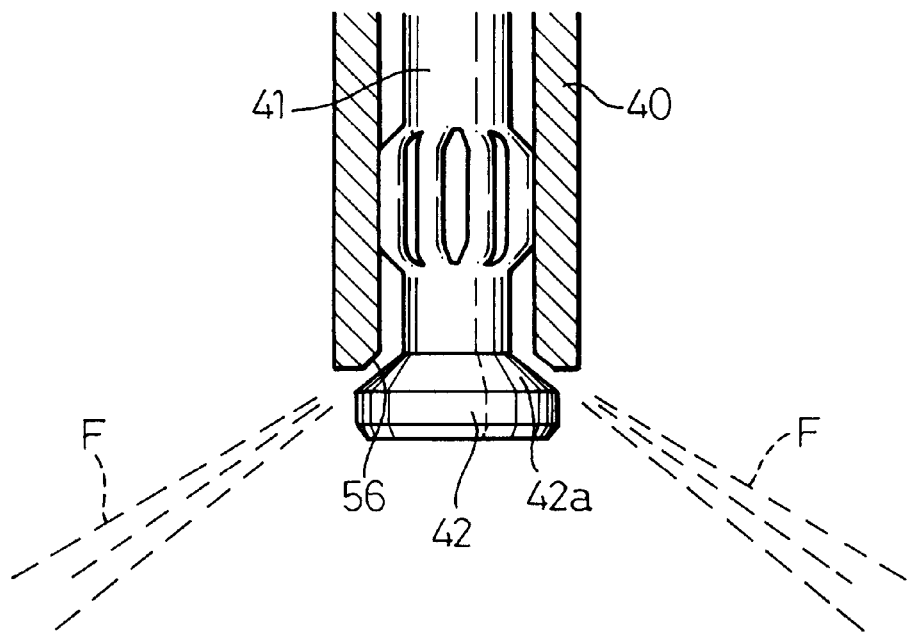
FIG. 5 is an enlarged side sectional view of a front end of a fuel injector.

FIG. 5 shows the front end of the needle 41. As shown in FIG. 5, the valve body 42 of the needle 41 has a conically shaped injected fuel guide face 42a, which injected fuel guide face 42a ordinarily sits on the seat face 56 by the spring force of the compression spring 44 (FIG. 4). At this time, the fuel injection from the fuel injector 10 is made to stop. When fuel is to be injected from the fuel injector 10, a charge is given to the piezoelectric element 48. When the piezoelectric element 48 is charged, the piezoelectric element 48 extends in the axial direction, so the piston 47 is made to descend. When the piston 47 is made to descend, the fuel pressure in the variable capacity chamber 50 rises and therefore the rod 45 is pushed down, so the needle 41 descends and the valve body 42 moves away from the seat face 56. As a result, the fuel inside the fuel storage chamber 46 is injected from between the valve body 42 and the seat face 56.

Next, if the charge given to the piezoelectric element 48 is released, the piezoelectric element 48 contracts in the axial direction and the piston 47 rises. As a result, the fuel pressure in the variable capacity chamber 50 falls, so the rod 45 and the needle 41 rise due to the spring force of the compression spring 44 and the injected fuel guide face 42a of the valve body 42 once again sits on the seat face 56. Accordingly, the injection action of the fuel is made to stop.

As shown in FIG. 5, when fuel is being injected, the injected fuel F is guided by the injected fuel guide face 42a of the valve body 42 and spreads from the front end of the needle 41, that is, from the nozzle port of the fuel injector 10, in a thin conical film. In the embodiment shown in FIG. 1 to FIG. 3, the fuel injector 10 is arranged at the center of the top portion of the combustion chamber 5 and therefore in the embodiment, the fuel F is injected so as to spread in a thin conical film from the center of the top portion of the combustion chamber 5 toward the portion around the combustion chamber 5.

Figure 7:
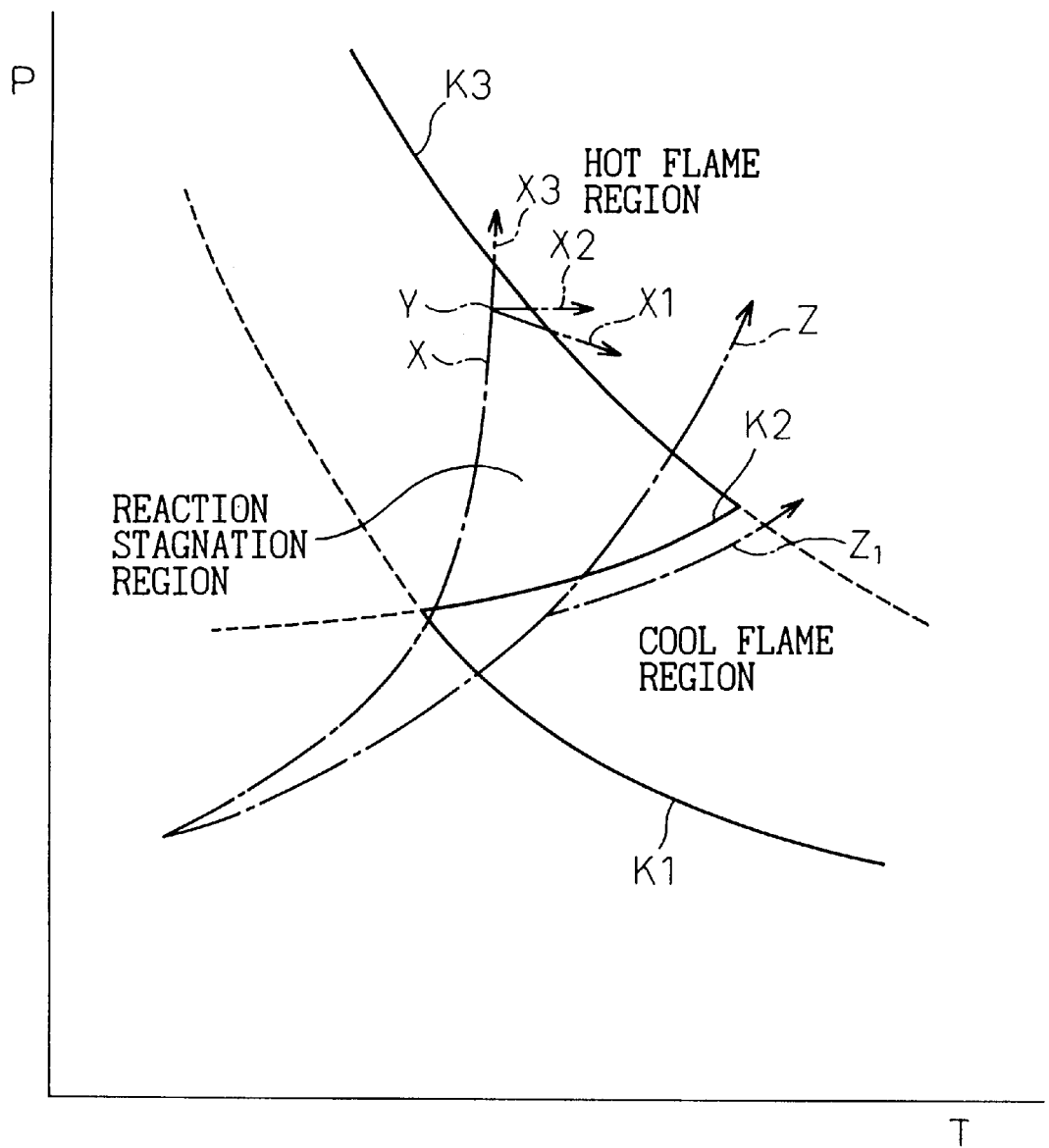
FIG. 7 is a view for explaining the method of combustion according to the present invention.

Next, an explanation will be made of the method of combustion forming the basis of the present invention while referring to FIG. 7. Note that in FIG. 7, the ordinate P shows the pressure in the combustion chamber 5, while the abscissa T shows the temperature of the fuel etc. in the combustion chamber 5. Further, in FIG. 7, the curve Z shows the relation between the pressure P in the combustion chamber 5 and the gas temperature T in the combustion chamber 5 during a compression stroke. As shown in FIG. 7, when the compression stroke progresses, the gas temperature T in the combustion chamber 5 gradually rises along with it.

When a self-ignitable fuel is supplied inside the combustion chamber 5, the temperature of the fuel particles rises, and sufficient air exists around the fuel particles at that time, however, usually first a cool flame reaction occurs and aldehydes are produced. The process of production of the aldehydes is not clear, but it is believed that the aldehydes are produced in the following way.

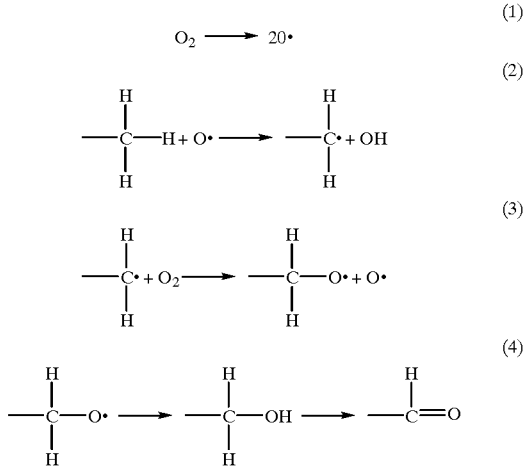

That is, as shown in the above reaction (1), first, the oxygen atoms become radicals. Next, as shown in the above reaction (2), the oxygen radicals attack the end carbons of the straight chain hydrocarbons. As a result, the end carbons of the straight chain hydrocarbons become radicals and hydroxy groups are produced. Next, as shown by the above reaction (3), the end carbon atoms react and oxygen radicals are bonded to the end carbons. Next, as shown by the above reaction (4), the oxygen radicals become hydroxy groups and then the hydroxy groups become aldehyde groups. The cool flame reaction occurs when the pressure P in the combustion chamber 5 and the temperature T of the fuel particles exceed the curve k1 shown in FIG. 7.

On the other hand, when the pressure P in the combustion chamber 5 and the temperature T of the fuel particles exceed the curve K2 shown in FIG. 7, the amount of aldehydes no longer changes. It is considered that the above reaction (3) and the reaction in the opposite direction reach an equilibrium state at this time and that therefore the generation of the aldehydes stops.

On the other hand, when the pressure P in the combustion chamber 5 and the temperature T of the fuel particles exceed the curve K3 shown in FIG. 7, the fuel is burned explosively. This region is called the "hot flame region" as shown in FIG. 7. In the region below the hot flame region, that is, below the curve K2, and above the curve K2, as explained above, the production of aldehydes is stopped, that is, the reaction enters a stagnant state, therefore the region below the curve K2 and above the curve K2 is called the "reaction stagnation region".

On the other hand, in the region below the curves K2 and K3 and above the curve K1, a cool flame reaction occurs. Therefore, this region is called the "cool flame region" as shown in FIG. 7.

As explained above, the curve Z of FIG. 7 shows the gas temperature T in the combustion chamber 5 during the compression stroke. If the particles of the fuel supplied into the combustion chamber 5 are small in size, the temperature of the fuel particles will substantially match the gas temperature T in the combustion chamber 5, so the temperature T of the fuel particles will rise along the curve Z cutting across the cool flame region across a broad range. That is, the fuel particles will remain in the cool flame region over a relatively long time.

As explained above, when in the cool flame region, aldehydes are produced. In this case, if the fuel particles remain in the cool flame region over a relatively long time, the end carbons of the straight chain hydrocarbons will detach as aldehydes. Since this will be repeated, the number of carbon atoms of the straight chain hydrocarbons will gradually fall. If the production of aldehydes progresses in this way, the amount of heat generated will increase. As a result, the temperature of the fuel particles will sharply rise, so the temperature T of the fuel particles will reach the hot flame region during the compression stroke as shown by Z1 in FIG. 7. If the temperature T of the fuel particles reaches the flame region, rapid combustion will occur and so-called premature ignition will be caused.

On the other hand, the curve X in FIG. 7 shows the changes in the temperature T of the large sized fuel particles. If the fuel particles become large in size, the speed of rise of the temperature of the fuel particles becomes slower, so as shown in FIG. 7 the temperature T of the fuel particles rises after passing through the vicinity of the minimum temperature of the cool flame region during the compression stroke. In the example shown in FIG. 7, the fuel particles remain in the cool flame region for an extremely short period. When the fuel particles remain in the cool flame region for only an extremely short period, almost no aldehydes are produced and any that are produced are extremely small in amount. In this case, the amount of heat generated is small and therefore there is no occurrence of premature ignition.

Next, when the compression stroke proceeds, the temperature T of the fuel particles rises along the curve X to inside the reaction stagnation region. As explained above, production of aldehydes ceases in the reaction stagnation region. Therefore, at this time, there is no heat generating action. Next, when the top dead center of the compression stroke is reached, in the example shown in FIG. 7, the fuel particles enter the state of Y right next to the curve K3 under the curve K3. In this state Y, combustion can occur extremely easily, but no combustion yet occurs. Next, when the top dead center of the compression stroke is exceeded and the pressure in the combustion chamber 5 starts to fall, the fuel boils and evaporates from the fuel particles. When the fuel boils and evaporates, as shown by X1 in FIG. 7, the temperature T of the evaporated fuel rises rapidly toward the gas temperature in the combustion chamber 5 shown by Z and immediately reaches the hot flame region. As a result, combustion of the fuel is started.

If the fuel particles collect at part of the combustion chamber 5 at this time, as explained later, the temperature in the combustion chamber 5 becomes a locally high temperature and $NO_x$ or soot is generated. At this time, however, if the fuel particles are dispersed uniformly in the combustion chamber 5, the temperature in the combustion chamber 5 becomes lower overall and therefore no $NO_x$ or soot is produced any longer. That is, when the temperature T of the fuel particles changes along the curve X and reaches the state Y, if the fuel particles are uniformly dispersed in the combustion chamber 5, no $NO_x$ or soot will be generated any more at all.

Figure 6:
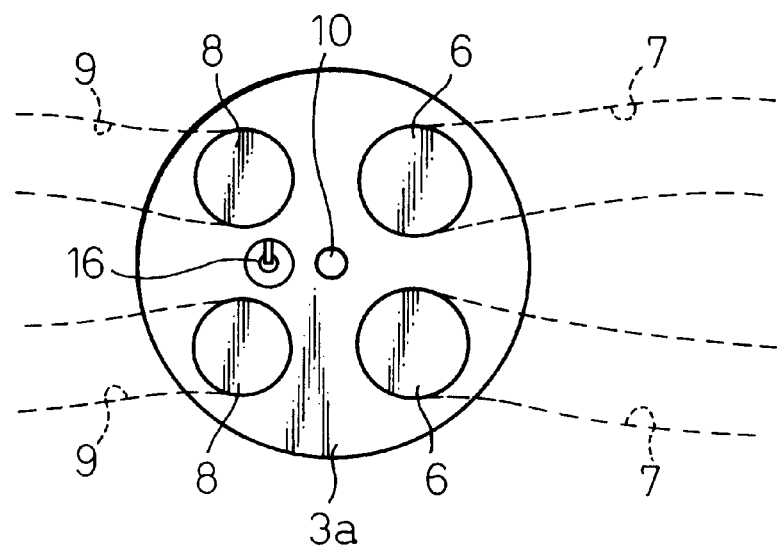
FIG. 6 is a bottom view of a cylinder head of another embodiment.

On the other hand, if ignition energy is given to the fuel particles when the fuel particles reach the state Y in FIG. 7, they will immediately reach the hot flame region as shown by X2 in FIG. 7 and the fuel will start to ignite. This ignition energy may be imparted for example by a spark plug 16 arranged on the wall 3a inside the cylinder head as shown in FIG. 6. Further, it is possible to use laser light or ultrasonic waves as the ignition energy.

Further, if the compression ratio of the engine is raised, the fuel particles will reach the hot flame region at substantially the top dead center of the compression stroke as shown by X3 of FIG. 7 and the fuel will start to ignite.

As mentioned above, when the fuel particles are small in size, the temperature T of the fuel particles will rise along the curve Z of FIG. 7 and as a result premature combustion will be caused. If premature combustion is caused, the combustion pressure will rapidly rise and a large amount of $NO_x$ and soot will be produced. As opposed to this, when the fuel particles are large in size, the temperature T of the fuel particles will rise along the curve X of FIG. 7. If the fuel particles are dispersed uniformly in the combustion chamber 5 when the fuel particles are in the state Y, no $NO_X$ or soot will be produced any longer. Therefore, one method for preventing any $NO_x$ or soot from being produced is to enlarge the size of the fuel particles.

Note that even if the fuel particles are made large in size, if the temperature T of the fuel particles becomes high, the temperature T of the fuel particles will remain in the cool flame region over a relatively long time such as shown by the curve Z and therefore premature ignition will be caused. That is, when the fuel particles receive a large amount of heat from the walls in the combustion chamber, when the temperature of the intake air taken into the combustion chamber 5 is high, and when the exhaust gas is recirculated, the temperature T of the fuel particles becomes higher, so even if the fuel particles are large in size, there is a great risk of premature ignition occurring.

As opposed to this, even when the fuel particles are small in size, when the temperature T of the fuel particles is low, it is not impossible to make the temperature T of the fuel particles change along the curve X. For example, by cooling the fuel, by cooling the intake air, or by injecting water so as to prevent the temperature T of the fuel particles from rising too much during the compression stroke, even if the fuel particles are small in size, it is possible to perform combustion without any production of $NO_x$ or soot at all.

Whatever the case, to completely prevent generation of $NO_x$ and soot, it is necessary to make the temperature T of the fuel particles rise through the vicinity of the minimum temperature of the cool flame region. In this case, the range of the vicinity of the minimum temperature cannot be clearly defined, but this range can be called a range where almost no heat is generated in the cool flame region.

Note that the present invention is aimed at multipoint ignition by self ignition, that is, bulk like combustion, so as the fuel, use is made of a fuel like light oil which can self ignite. Of course, it is also possible to use gasoline as the fuel, but ordinary gasoline will not self-ignite, so it is not possible to use ordinary gasoline. In this case, if the cetane value is more than 5, even gasoline will self ignite, so even gasoline can be used if it has a cetane value of more than 5. Further, it is possible to use fuels other than light oil or gasoline so long as they have cetane values of more than 5.

Next, a little more detailed explanation will be given of the case of increasing the size of the particle size of the injected fuel in order to prevent any $NO_x$ or soot from being produced. Note that an explanation will also be made of the need for causing the fuel particles to disperse uniformly in the combustion chamber 5. Note that below the explanation will be made focusing on the time of high load operation when soot or $NO_x$ easily occurs.

In so far as the fuel is atomized as in the past so that the mean particle size of the fuel particles becomes less than 50 $\mu$m, no matter how the injection timing is set, it will be difficult to try to simultaneously reduce the soot and $NO_x$. On top of this, it will be impossible to reduce the amount of generation of soot and $NO_x$ to zero. This is because there are inherent problems in the conventional method of combustion. That is, in the conventional method of combustion, since the fuel particles are small in size, when the fuel is just being injected, some of the fuel immediately vaporizes. The vaporized fuel causes rapid combustion to be started early. If rapid combustion is started early after the start of injection, the later injected fuel will fly into the flame of combustion, so that injected fuel will be burned in a state of shortage of air and accordingly soot will be produced. Further, if the injected fuel rapidly burns early and the pressure of combustion rapidly rises, the combustion temperature will become higher and therefore $NO_x$ will be produced.

If however the mean particle size of the injected fuel is made much larger than the mean particle size used in the conventional method of combustion and the injection timing is made considerably earlier than the injection timing normally used in the conventional method of combustion, it is possible to reduce the amount of generation of soot and $NO_x$ to substantially zero. This will be explained next.

Figure 8:
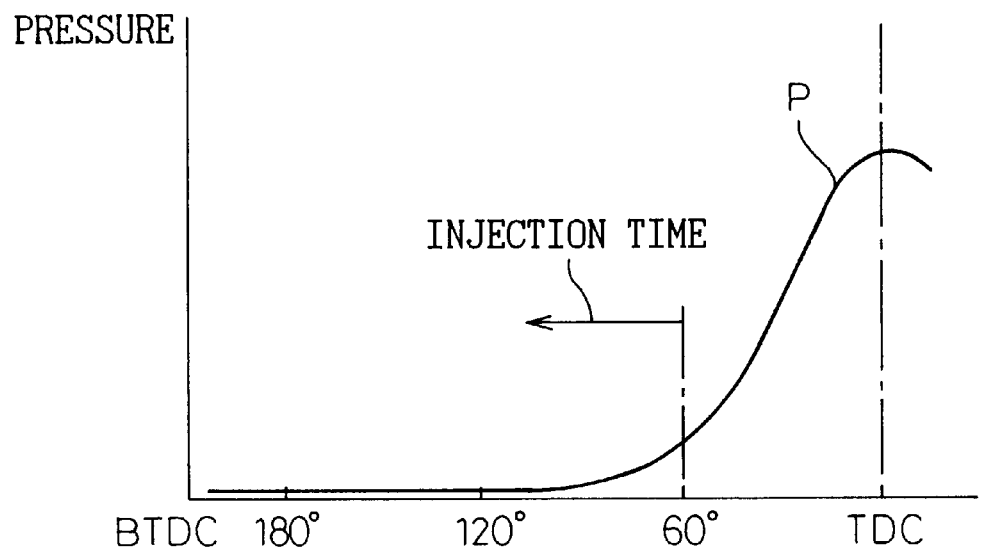
FIG. 8 is a view of the changes in pressure in the combustion chamber caused by just the compression action of a piston.

The curve of FIG. 8 shows the changes in the pressure P in the combustion chamber 5 due to the action of compression of the piston 4. As will be understood from FIG. 8, the pressure P in the combustion chamber 5 rises rapidly once 60 degrees before top dead center (BTDC) of the compression stroke is passed. This is regardless of the timing of opening of the intake valve 6. With any reciprocating type internal combustion engine, the pressure P in the combustion chamber 5 changes as shown in FIG. 8.

Figure 9:
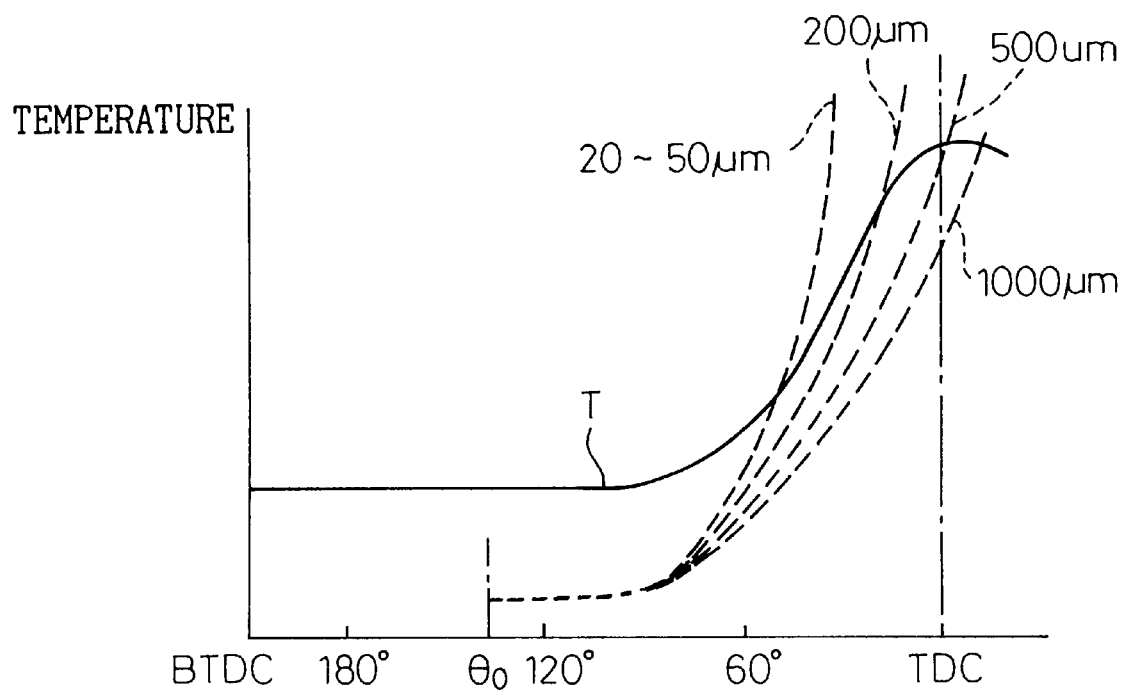
FIG. 9 is a view of the boiling point and the changes in temperature of the fuel particles.

The curve shown by the solid line in FIG. 9 shows the boiling temperature of the main ingredient of the fuel at different crank angles, that is, the boiling point T. If the pressure P in the combustion chamber 5 rises, the boiling point T of the main fuel ingredient will rise along with it, so the boiling point T of the main fuel ingredient will rise rapidly once past 60 degrees before top dead center (BTDC) of the compression stroke. On the other hand, the broken lines in FIG. 8 show the differences in the changes in temperature of the fuel particles due to the differences in size of the fuel particles when fuel is injected at θ degrees before top dead center BTDC of the compression stroke. The temperature of the fuel particles immediately after injection is lower than the boiling point T determined by the pressure at that time, then the fuel particles receive heat from the surroundings and rise in temperature. The rate of rise in temperature of the fuel particles at this time becomes faster the smaller the particle size.

That is, assuming the fuel particles are from 20 μm to 50 μm or so in size, the temperature of the fuel particles rises rapidly after injection and reaches the boiling point T at a crank angle far before the top dead center (TDC) of the compression stroke, whereupon rapid evaporation of the main fuel ingredient due to boiling from the fuel particles is started. Further, as will be understood from FIG. 9, even when the fuel particles are 200 μm in size, the temperature of the fuel particles reaches the boiling point T before the top dead center (TDC) of the compression stroke is reached, whereupon rapid evaporation of the main fuel ingredient is started. In this case, the fuel particles remain in the cool flame region across a relatively long time as shown by the curve Z of FIG. 7. As a result, explosive combustion due to premature ignition occurs and therefore a large amount of soot and $NO_x$ are produced.

As opposed to this, if the size of the fuel particles becomes larger than about 500 μm, the rate of rise of the temperature of the fuel particles becomes slower, so the temperature of the fuel particles will not reach the boiling point T until substantially the top dead center (TDC) of the compression stroke or after. That is, in this case, the temperature of the fuel particles will rise past the vicinity of the minimum temperature of the cool flame region as shown by the curve X in FIG. 7. Therefore, if the fuel particles become larger in size than about 500 μm, the action of rapid evaporation of the main fuel ingredients due to the boiling will start at substantially the top dead center (TDC) of the compression stroke or after the top dead center (TDC) of the compression stroke. Therefore, if the fuel particles become larger in size than about 500 μm, it will be possible to prevent the generation of soot and $NO_x$ based on the cool flame reaction.

Note that it is impossible for the fuel particles to become completely uniform in size, so when considering the particle size of the injected fuel, it can be said to be preferable to think in terms of the mean particle size of the injected fuel. Considered in this way, by making the mean particle size of the injected fuel a particle size where the temperature of the fuel particles reaches the boiling point T of the main fuel ingredient, determined by the pressure at that time, at substantially the top dead center (TDC) of the compression stroke or after top dead center (TDC) of the compression stroke, rapid evaporation occurs due to boiling from the fuel particles after substantially top dead center (TDC) of the compression stroke.

To make the amount of generation of the soot and $NO_x$ substantially zero, however, it is necessary, in addition to making the size of the fuel particles larger than about 500 μm, to make the injected fuel particles disperse uniformly in the combustion chamber 5. Next, this will be explained with reference to FIG. 10. Note that in FIG. 10, X shows the fuel particles.

If the fuel is injected early in the compression stroke in the above way and the size of the fuel particles X at that time is made larger than substantially 500 μm, the action of evaporation of the main fuel ingredient due to boiling from the fuel particles X will be prevented until the substantially top dead center (TDC) of the compression stroke is reached. The injected fuel, however, contains low boiling point ingredients. The boiling temperature of the low boiling point ingredients, that is, the initial boiling point, becomes considerably lower than the boiling temperature T of the main fuel ingredient. Therefore, if the temperature in the combustion chamber 5 at the time of fuel injection is above the initial boiling point, the low boiling point ingredients in the injected fuel will immediately evaporate. As opposed to this, if the temperature in the combustion chamber 5 at the time of fuel injection is less than the initial boiling point, the low boiling point ingredients in the injected fuel will evaporate when the temperature in the combustion chamber 5 passes the initial boiling point. If the low boiling point ingredients in the injected fuel are burned, a layer of evaporated fuel of the low boiling point ingredient will be formed around the fuel particles X.

On the other hand, when the compression stroke proceeds, the temperature in the combustion chamber 5 will rise. When the temperature in the combustion chamber 5 reaches more than a predetermined temperature, the evaporated fuel around the fuel particles X will bond with the oxygen and be burned. That is, combustion due to an oxidation reaction of the evaporated fuel around the fuel particles X will be started. At this time, the regions where the heat of combustion of the evaporated fuel around the fuel particles X reaches are shown by the broken lines Y around the fuel particles X in FIGS. 10A and 10B. When the density of the fuel particles X is low as shown in FIG. 10A, the regions Y will be separate from each other, while when the density of the fuel particles X is high as shown in FIG. 10B, the regions Y will overlap each other.

Figure 10A:
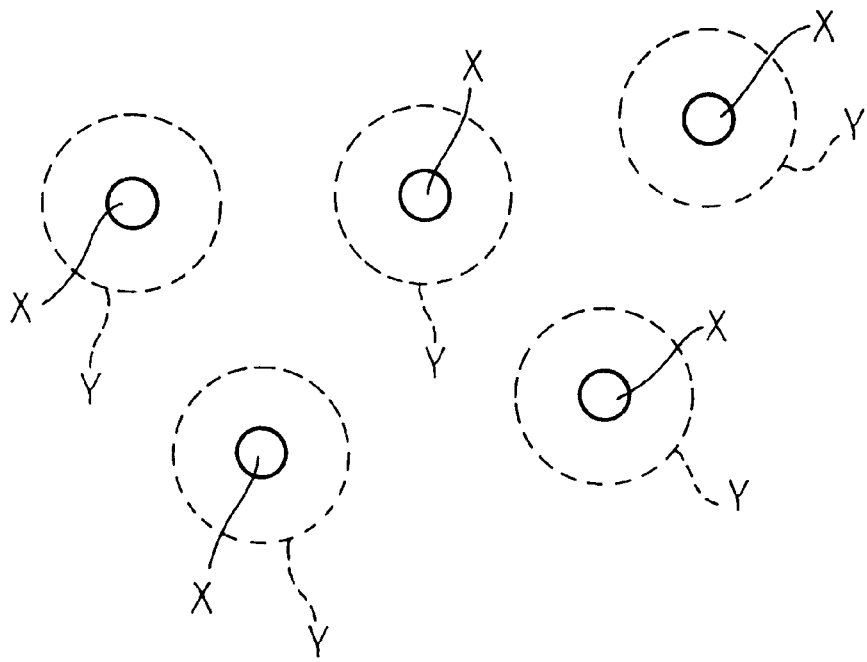
FIGS. 10A and 10B are views of the distribution of fuel particles.
Figure 10B:
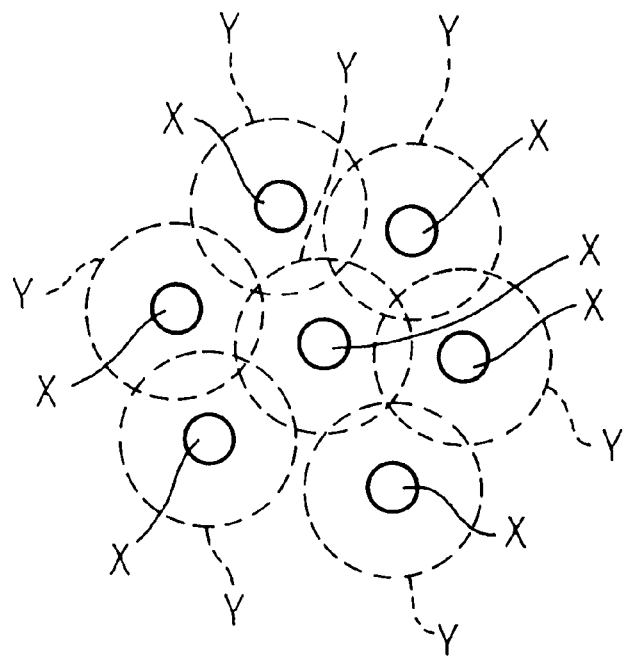

If the regions Y overlap with each other as shown in FIG. 10B, the temperature of the empty regions between the fuel particles will become higher due to the heat of combustion of the evaporated fuel around the fuel particles X. If the temperature of the empty regions between the fuel particles X becomes higher in this way, the fuel particles X will become high in temperature and as a result the hydrocarbons in the fuel particles X will be decomposed by heat into hydrogen atoms X2, carbon C, and methane CH4. As a result, if the temperature in the combustion chamber 5 rises, the hydrogen atoms $H_2$ will burn explosively and therefore the temperature in the combustion chamber 5 will become extremely high, so a large amount of $NO_x$ will be produced. Further, if carbon C is produced by this heat decomposition, the carbon atoms will bond with each other to produce soot. That is, if the density of the fuel particles becomes high as shown in FIG. 10B, that is, if a locally rich region is formed in the combustion chamber 5, $NO_x$ and soot will be produced.

As opposed to this, if the regions Y are separate from each other as shown in FIG. 10A, the heat of combustion of the evaporated fuel around the fuel particles X will not be transmitted to the regions Y around other fuel particles X and as a result the temperatures of the fuel particles X will not become that high. As a result, no heat decomposition of the hydrocarbons in the fuel particles X will occur, so there will be no explosive combustion due to hydrogen atoms $H_2$ and accordingly the temperature in the combustion chamber 5 will not become extremely high, so it will be possible to prevent the production of $NO_x$. Further, since no carbon C will be produced due to the heat decomposition, carbon atoms will not bond and grow to soot. In this way, if the fuel particles X are uniformly dispersed and the density of the fuel particles X becomes lower as shown in FIG. 10A, production of soot and $NO_x$ can be prevented.

Figure 11A:
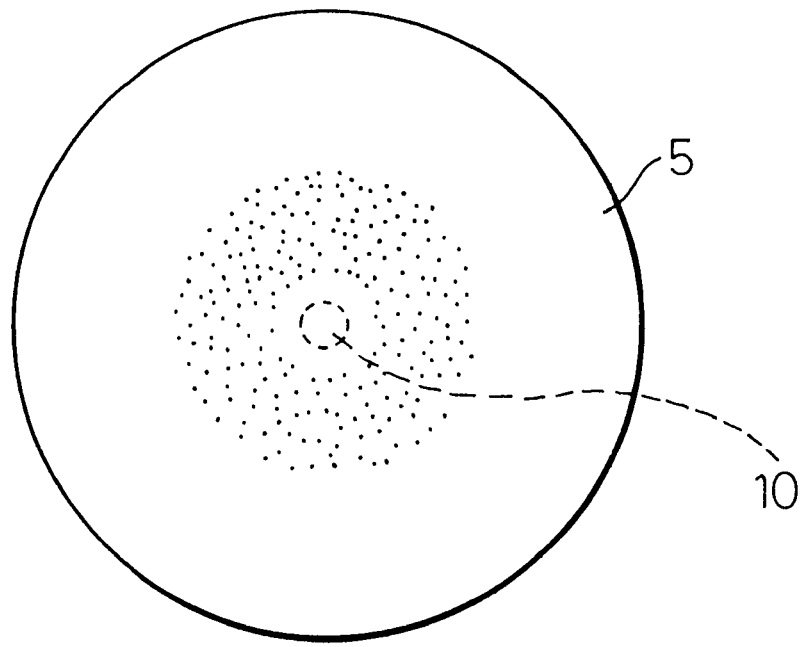
FIGS. 11A and 11B are views of the distribution of fuel particles.
Figure 11B:
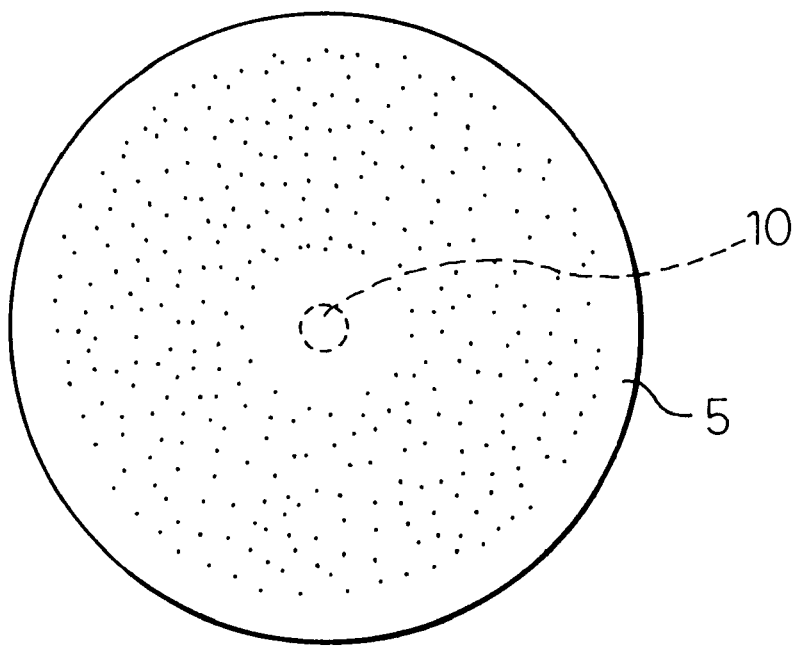

To uniformly disperse the fuel particles X throughout the combustion chamber 5 as shown in FIG. 10A, however, it is necessary to inject the fuel from the fuel injector 10 when the pressure P in the combustion chamber 5 is low. That is, if the pressure P in the combustion chamber 5 becomes high, the air resistance will become greater, so the distance of flight of the injected fuel will become shorter and therefore at this time, as shown in FIG. 11A, the fuel particles will not be able to spread throughout the combustion chamber 5 as a whole. As explained above, the pressure P in the combustion chamber will rise rapidly when substantially 60 degrees before top dead center (BTDC) of the compression stroke is past. If fuel is injected after substantially 60 degrees before top dead center (BTDC) of the compression stroke is past, the fuel particles will not spread sufficiently in the combustion chamber 5 as shown in FIG. 11A. As opposed to this, before substantially 60 degrees before top dead center (BTDC) of the compression stroke, the pressure P in the combustion chamber 5 is low, therefore if fuel is injected before substantially 60 degrees before top dead center (BTDC) of the compression stroke, the fuel particles will disperse uniformly throughout the entire combustion chamber 5 as shown in FIG. 11B. That is, to cause the fuel particles to disperse uniformly throughout the entire combustion chamber 5, it is necessary to inject the fuel before substantially 60 degrees before top dead center (BTDC) of the compression stroke.

Figure 12:
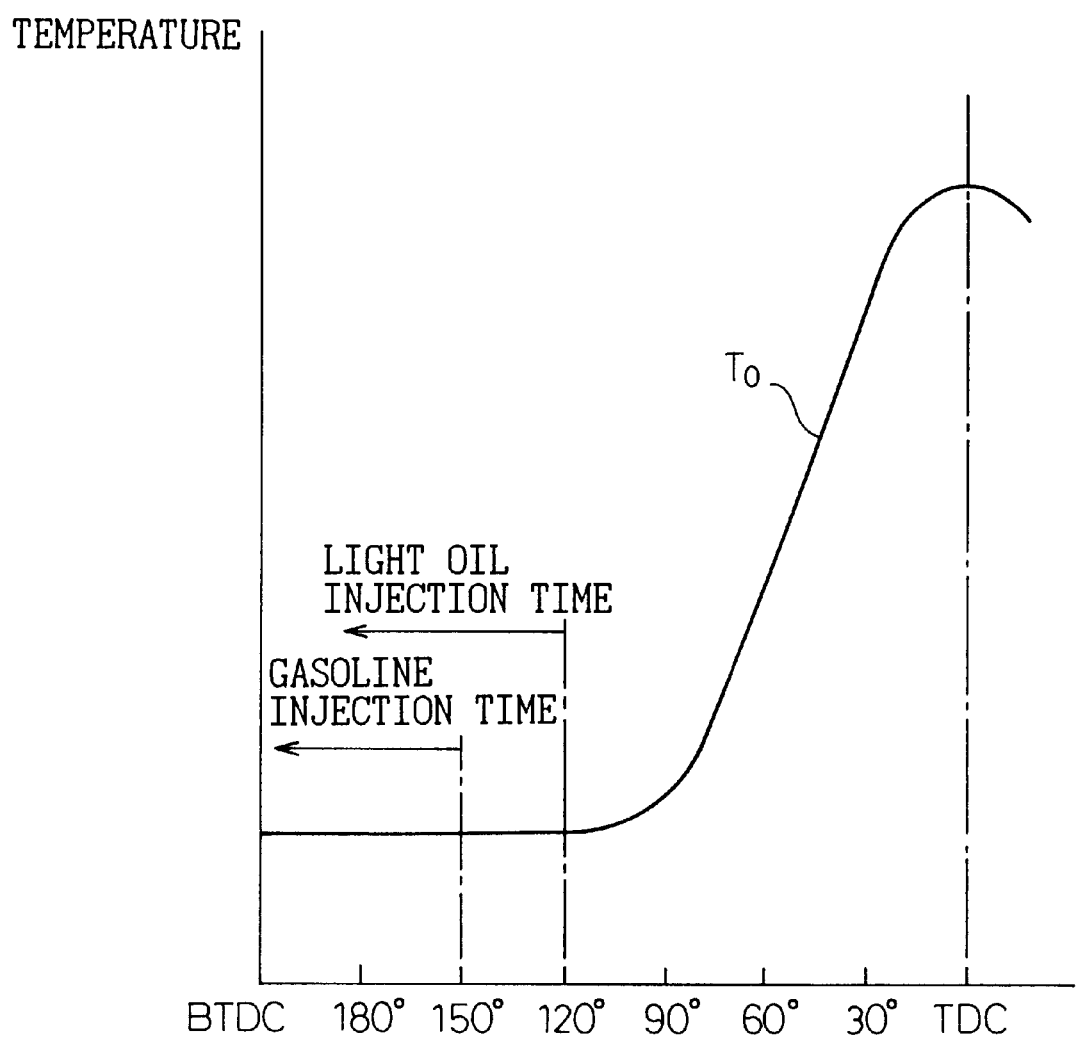
FIG. 12 is a view of the temperature in the combustion chamber.

As shown in FIG. 12, however, the temperature $T_0$ in the combustion chamber 5 starts to rise rapidly from the vicinity of 90 degrees before top dead center BTDC of the compression stroke. In the vicinity of 60 degrees before top dead center (BTDC) of the compression stroke, the temperature $T_0$ in the combustion chamber 5 also becomes higher than the initial boiling point of the injected fuel. Therefore, if the fuel is injected before 60 degrees before top dead center (BTDC) of the compression stroke, the fuel particles will be dispersed over a wide range, but if the temperature $T_0$ in the combustion chamber 5 is higher than the initial boiling point, the low boiling point ingredients of the injected fuel will immediately evaporate just when the fuel is being injected, therefore a region of high density of evaporated fuel of the low boiling point ingredients will be locally formed around the fuel injector 10.

If such a region of high density of evaporated fuel is formed in this way, that is, if a locally rich region is formed in the combustion chamber 5, as shown in FIG. 10A, even if the interval between fuel particles X becomes larger, the regions Y where the heat of combustion of the evaporated fuel reaches will not end up separate from each other as shown in FIG. 10A and in the regions of high density of the evaporated fuel, the spaces between the fuel particles X will end up filled with the evaporated fuel. If spaces between fuel particles X are filled by evaporated fuel in this way, however, when the evaporated fuel burns, the fuel particles X will become high in temperature due to the heat of combustion of the evaporated fuel. As a result, the hydrocarbons in the fuel particles X will be decomposed by heat into hydrogen atoms $H_2$ and carbon C and therefore $NO_x$ and soot will be produced.

To prevent this generation of $NO_x$ and soot, it is necessary to prevent the local formation of a region with a high density of evaporated fuel of the low boiling point ingredient, that is, to realize the state shown in FIG. 10A. Therefore, it becomes necessary to make the evaporation of the low boiling point ingredients from the fuel particles X start when the fuel particles X finish being dispersed or after the same, that is, to complete the action of injection of fuel and dispersion of the fuel particles X before the temperature $T_0$ in the combustion chamber 5 reaches the initial boiling point. If the fuel particles X are made to disperse before the temperature $T_0$ in the combustion chamber 5 reaches the initial boiling point, the evaporation of the low boiling point ingredients from the fuel particles X will start when the temperature in the combustion chamber 5 reaches the initial boiling point, therefore the regions Y will become separate from each other as shown in FIG. 10A. As a result, heat decomposition will not occur in the fuel particles X and therefore $NO_x$ and soot will not be generated.

Giving a detailed example, ordinary light oil contains various fuel ingredients with boiling points from 150° C. to 360° C. or so. Therefore, the initial boiling point of light oil is about 150° C. The temperature $T_0$ in the combustion chamber 5 reaches about 150° C. around 70 degrees before top dead center (BTDC) of the compression stroke. The crank angle by which the fuel particles finish being dispersed after the injection can be considered to be about 40 degrees, so allowing for some leeway, it is necessary to complete the injection before about 120 degrees before top dead center (BTDC) of the compression stroke. Therefore, in the embodiment of the present invention, when using light oil, the fuel injection is completed before 120 degrees before top dead center (BTDC) of the compression stroke.

On the other hand, in the case of use of gasoline, as explained above, use is made of gasoline with a cetane value of more than 5. This gasoline includes various fuel ingredients with boiling points from 30° C. to 160° C. or so. Therefore, the initial boiling point of gasoline is about 30° C. The temperature $T_0$ in the combustion chamber 5 reaches about 30° C. around 100 degrees before top dead center (BTDC) of the compression stroke. As explained above, the crank angle by which the fuel particles finish being dispersed after the injection can be considered to be about 40 degrees, so allowing for some leeway, it is necessary to complete the injection before about 150 degrees before top dead center (BTDC) of the compression stroke. Therefore, in the embodiment of the present invention, when using gasoline, the fuel injection is completed before 150 degrees before top dead center (BTDC) of the compression stroke.

Figure 13A:
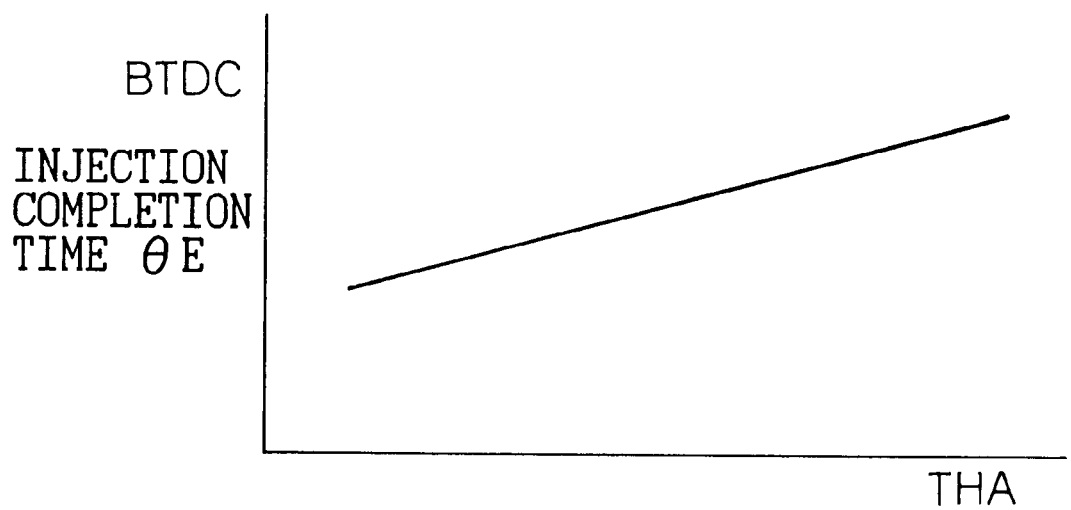
FIGS. 13A and 13B are views of the timing of completion of the fuel injection and the amount of the fuel injection.
Figure 13B:
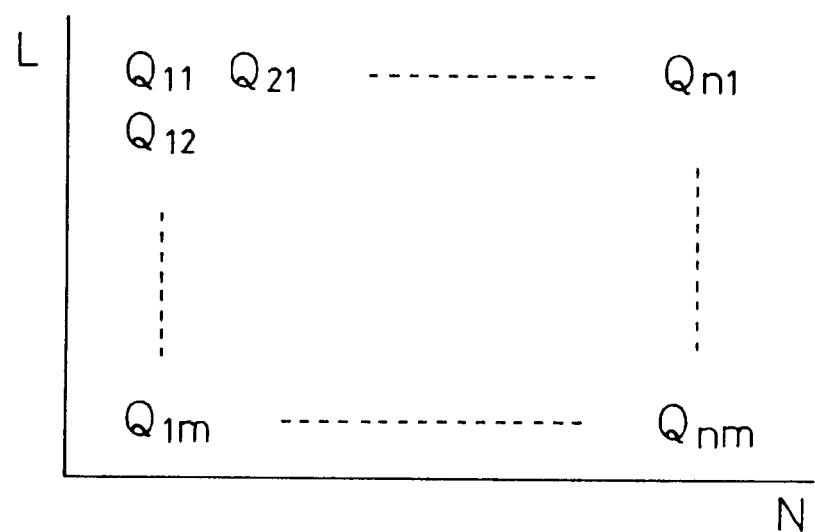

Note that the temperature $T_0$ in the combustion chamber 5 is determined by the compression ratio and the intake air temperature, while the initial boiling point is determined in accordance with the fuel. The compression ratio is determined by the engine, while the initial boiling point of commercially sold fuel is in a substantially set range, so the temperature $T_0$ in the combustion chamber 5 in practice becomes a function of just the intake air temperature. The higher the intake air temperature, the earlier the crank angle where the initial boiling point is reached, so as shown in FIG. 13A, the higher the intake air temperature THA, the earlier the timing of end of the injection θE. Note that the injection timing may be during either the compression stroke or the intake stroke.

In working this combustion method, the important point is to cause the large particle size fuel to disperse uniformly throughout the inside of the combustion chamber 5 while maintaining an interval between the fuel particles. Therefore, when seen from the perspective of the hardware, the fuel injector 10 plays an important role in working the method of combustion. FIG. 4 shows an example of the fuel injector 10 suited for working this method of combustion. In this fuel injector 10, the fuel injection pressure is set to a low pressure of about 20 MPa so as to enable the fuel particles to be made large in size.

Figure 14:
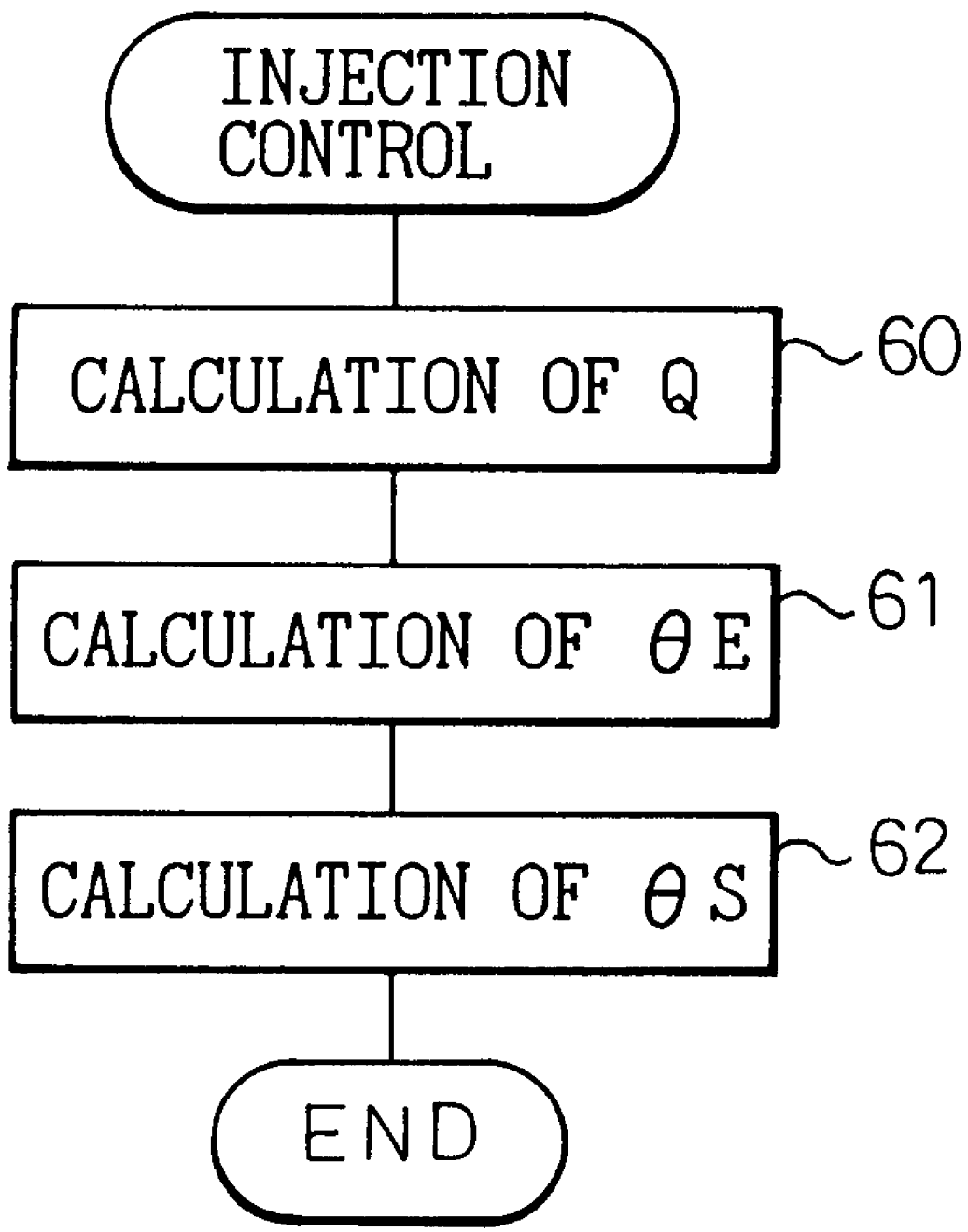
FIG. 14 is a flow chart for the control of the fuel injection.

FIG. 14 shows the fuel control routine.

Referring to FIG. 14, first, at step 60, the amount of fuel injection Q is calculated. The amount of fuel injection Q is stored in advance in the ROM 22 in the form of the map shown in FIG. 3B as a function of the amount of depression L of the accelerator pedal 30 and the engine speed N. Next, at step 61, the timing of the end of the fuel injection θE is calculated from the relationship shown in FIG. 13A. Next, at step 62, the timing of start of the fuel injection θS is calculated from the amount of fuel injection Q, the timing of end of the fuel injection θE, and the engine speed N. The fuel is injected from the fuel injector 10 based on this timing of start of fuel injection θS and the timing of end of fuel injection θE.

According to the present invention, as explained above, it is possible to reduce the amount of soot and $NO_x$ generated to substantially zero.

While the invention has been described with reference to specific embodiments chosen for purposes of illustration, it should be apparent that numerous modifications could be made thereto by those skilled in the art without departing from the basic concept and scope of the invention.

We claim:

1. An internal combustion engine comprising:
   a combustion chamber;
   a fuel injector arranged in the combustion chamber; and
   means for controlling an injection of fuel to the combustion chamber at a completion timing selected from one of a timing during a compression stroke and a timing at a predetermined crank angle during a suction stroke, the completion timing being advanced by a predetermined crank angle relative to a crank angle at which a combustion chamber temperature reaches a fuel boiling point, the injection control means controlling a mean particle size of the injected fuel so that, at top dead center of the compression stroke, a fuel particle temperature reaches a boiling point of a main ingredient of the fuel determined based on a pressure in the combustion chamber, thereby preventing evaporation of the fuel due to boiling of the main ingredient until top dead center of the compression stroke, the completion timing determined when the fuel is gasoline being advanced relative to the completion timing determined when the fuel is light oil.

2. An internal combustion engine as set forth in claim 1, wherein, when the fuel is light oil, the fuel injection is completed before substantially 120 degrees before top dead center of the compression stroke.

3. An internal combustion engine as set forth in claim 1, wherein, when the fuel is gasoline, the fuel injection is completed before substantially 150 degrees before top dead center of the compression stroke.

4. An internal combustion engine as set forth in claim 1, wherein the mean particle size of the fuel particles is at least 500 μm.

5. An internal combustion engine as set forth in claim 1, wherein the fuel injector is provided with a fuel storage chamber.

6. An internal combustion engine as set forth in claim 1, wherein the fuel is injected from the fuel injector in a thin, cone-shaped film.

7. An internal combustion engine as set forth in claim 1, wherein the injection control means advances the completion timing as an intake air temperature becomes higher.

8. An internal combustion engine as set forth in claim 1, further comprising means for imparting an ignition energy to the fuel particles and wherein the fuel is ignited and burned by the energy imparted by the energy imparting means.

9. An internal combustion engine as set forth in claim 8, wherein the energy imparting means is a spark plug.

10. An internal combustion engine as set forth in claim 1, wherein a compression ratio is set so that the fuel particle temperature rises along a curve extending through the reaction stagnation region to enter the hot flame region near the top dead center of the compression stroke.

11. An internal combustion engine as set forth in claim 1, wherein the cetane value of the fuel is more than 5.

* * * * *